United States Patent
Sheshagiri et al.

(10) Patent No.: US 8,028,283 B2
(45) Date of Patent: Sep. 27, 2011

(54) METHOD AND SYSTEM FOR AUTOMATED INVOCATION OF DEVICE FUNCTIONALITIES IN A NETWORK

(75) Inventors: Mithun Sheshagiri, Berkeley, CA (US); Alan Messer, Los Gatos, CA (US); Anugeetha Kunjithapatham, Sunnyvale, CA (US); Priyang Rathod, Mountain View, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1226 days.

(21) Appl. No.: 11/725,376

(22) Filed: Mar. 19, 2007

(65) Prior Publication Data

US 2007/0220529 A1    Sep. 20, 2007

Related U.S. Application Data (60) Provisional application No. 60/784,281, filed on Mar. 20, 2006.

(51) Int. Cl.
    *G06F 9/46* (2006.01)
(52) U.S. Cl. .............................. 718/1; 717/115; 717/139
(58) Field of Classification Search ...... 718/1; 717/115, 717/139
    See application file for complete search history.

(56) References Cited

U.S. PATENT DOCUMENTS

| | | | |
|---|---|---|---|
| 5,544,321 A | 8/1996 | Theimer et al. |
| 5,555,376 A | 9/1996 | Theimer et al. |
| 5,611,050 A | 3/1997 | Theimer et al. |
| 5,812,865 A | 9/1998 | Theimer et al. |
| 5,910,799 A | 6/1999 | Carpenter et al. |
| 6,169,991 B1 | 1/2001 | Tsukahara |
| 6,256,019 B1 | 7/2001 | Allport |
| 6,389,288 B1 | 5/2002 | Kuwahara et al. |
| 6,563,430 B1 | 5/2003 | Kemink et al. |
| 6,618,764 B1 | 9/2003 | Shteyn |
| 6,640,218 B1 | 10/2003 | Golding et al. |
| 6,748,462 B2 | 6/2004 | Dubil |
| 6,817,028 B1 | 11/2004 | Jerding |
| 6,822,698 B2 | 11/2004 | Clapper |
| 6,823,519 B1 | 11/2004 | Baird |
| 6,857,128 B1 | 2/2005 | Borden |
| 6,859,197 B2 | 2/2005 | Klein |
| 6,954,737 B2 | 10/2005 | Kalantar et al. |
| 6,957,075 B1 | 10/2005 | Iverson |
| 7,024,256 B2 | 4/2006 | Krzyzanowski et al. |
| 7,046,263 B1 | 5/2006 | Abbott et al. |

(Continued)

FOREIGN PATENT DOCUMENTS

EP    1168124    1/2002

(Continued)

OTHER PUBLICATIONS

U.S. Advisory Action for U.S. Appl. No. 11/121,820 mailed Jun. 30, 2009.

(Continued)

*Primary Examiner* — Andy Ho
(74) *Attorney, Agent, or Firm* — Beyer Law Group LLP (57) ABSTRACT

A method and system that enable an automatic invocation of device functionalities on devices in a network. Invocation mechanisms are provided to support heterogeneous invocation mechanisms including new invocation mechanisms. Invocation mechanisms using scripts can be added without the need for recompilation of support systems such as home-networking middleware systems. This further enables the use of scripts that can coordinate the use of multiple devices in accomplishing a task.

37 Claims, 7 Drawing Sheets

U.S. PATENT DOCUMENTS

| | | | |
|---|---|---|---|
| 7,064,675 B2 | 6/2006 | Zigmond et al. | |
| 7,076,255 B2 | 7/2006 | Parupudi et al. | |
| 7,170,422 B2 | 1/2007 | Nelson et al. | |
| 7,184,848 B2 | 2/2007 | Krzyzanowski et al. | |
| 7,206,559 B2 | 4/2007 | Meade, II | |
| 7,307,746 B2 | 12/2007 | Inoue | |
| 7,336,942 B2 | 2/2008 | Wang | |
| 7,337,217 B2 | 2/2008 | Wang | |
| 7,346,663 B2 | 3/2008 | Abbott et al. | |
| 7,522,549 B2 | 4/2009 | Karaoguz et al. | |
| 7,533,079 B2 | 5/2009 | Naito et al. | |
| 7,613,285 B2 | 11/2009 | Ha et al. | |
| 7,640,546 B2 * | 12/2009 | Zarenin et al. | 718/102 |
| 2001/0032132 A1 | 10/2001 | Moran | |
| 2001/0033554 A1 | 10/2001 | Ayyagari et al. | |
| 2001/0047431 A1 | 11/2001 | Eytchison | |
| 2002/0130834 A1 | 9/2002 | Madarasz et al. | |
| 2002/0138327 A1 | 9/2002 | Mello et al. | |
| 2003/0046401 A1 | 3/2003 | Abbott et al. | |
| 2003/0208569 A1 * | 11/2003 | O'Brien et al. | 709/221 |
| 2004/0230636 A1 | 11/2004 | Masuoka et al. | |
| 2005/0097478 A1 | 5/2005 | Killian et al. | |
| 2005/0246726 A1 | 11/2005 | Labrou et al. | |
| 2006/0064693 A1 | 3/2006 | Messer et al. | |
| 2006/0064694 A1 | 3/2006 | Messer et al. | |
| 2006/0069602 A1 | 3/2006 | Messer et al. | |
| 2006/0156252 A1 | 7/2006 | Sheshagiri et al. | |
| 2006/0156307 A1 | 7/2006 | Kunjithapatham et al. | |
| 2006/0248233 A1 | 11/2006 | Park et al. | |
| 2007/0266384 A1 | 11/2007 | Labrou et al. | |
| 2007/0279389 A1 | 12/2007 | Hoch et al. | |
| 2008/0270999 A1 * | 10/2008 | Goring et al. | 717/139 |

FOREIGN PATENT DOCUMENTS

| | | |
|---|---|---|
| FR | 2852173 | 9/2004 |
| KR | 20010041425 | 5/2001 |
| KR | 20020022049 | 3/2002 |
| WO | 0038039 | 6/2000 |
| WO | 0039964 | 7/2000 |
| WO | 0169380 | 9/2001 |
| WO | 2004081713 | 9/2004 |
| WO | WO2005003967 | 1/2005 |

OTHER PUBLICATIONS

U.S. Non-final Office Action for U.S. Appl. No. 11/444,994, mailed Apr. 27, 2009.
U.S. Final Office Action for U.S. Appl. No. 11/121,820 mailed Apr. 15, 2009.
U.S. Non-final Office Action for U.S. Appl. No. 11/121,820 mailed Oct. 14, 2008.
U.S. Non-final Office Action for U.S. Appl. No. 11/121,820 mailed Aug. 20, 2009.
Nevo for IPAQ, downloaded Oct. 19, 2006.
Berners-Lee, T. et al., WC3 Semantic Web, Technology and Society Domain, "Semantic Web", pp. 1-5, United States.
Lashina, T. et al., "The context aware personal remote control: a case study on context awareness", Published 2003, pp. 1-6, United States.
Masuoka, R. et al., "Task Computing—The Semantic Web meets Pervasive Computing -," pp. 866-881, Oct. 2003 Proceedings, In D. Fensel et al. (Eds.), "The Semantic Web—ISWC 2003," the Second International Semantic Web Conference (ISWC 2003), Sanibel Island, FL, USA, LNCS 2870.
European Search Report and Search Opinion; Application No. 06250036.8-1525; dated Sep. 17, 2007.
Kumar, R. et al., "User-Centric Appliance Aggregation", HP Labs Technical Report HPL-2002-277, Oct. 2, 2002. pp. 1-16, United States.
Paolucci, M. et al., "Semantic Matching of Web Services Capabilities", In First Int. Semantic Web. Conf. 2002, pp. 333-347, United States.
Sycara, K. et al., "Larks: Dynamic Matchmaking among Heterogeneous Software Agents in Cyberspace", Autonomous Agents and Multi-Agent Systems, 2002, pp. 173-203, Kluwer Academic Publishers, United States.
Gonzalez-Castillo, J. et al., "Description Logics for Matchmaking of Services", Hewlett-Packard Company, 2001, pp. 1-13, Bristol, United Kingdom.
Avancha, S. et al., "Enhanced Service Discovery in Bluetooth", IEEE Computer, Jun. 28, 2002. pp. 96-99, vol. 35, University of Maryland, Baltimore County, United States.
Chakraborty, D. et al., "DReggie: Semantic Service Discovery for M-Commerce Applications", Workshop on Reliable and Secure Applications in Mobile Environment, In Conjunction with 20th Symposium on Reliable Distributed Systems (SRDS), Oct. 12, 2001, pp. 1-6, United States.
Milojicic, D. et al., "Appliance Aggregation Architecture (A3)", HP Labs Technical report HPL-2002-277, Jul. 3, 2003, pp. 1-10, United States.
Hendler, J. et al., "Integrating Applications on the Semantic Web," Journal of the Institute of Electrical Engineers of Japan, Oct. 2002, pp. 676-680, vol. 122(10), United States.
Haarslev, V. et al., "Description of the RACER System and its Applications", In Proceedings of the International Workshop in Description Logics 2001 (DL2001), Aug. 2001, Stanford, pp. 701-705, United States.
"OWL Web Ontology Language Reference", WC3 Semantic Web, Dec. 9, 2003, United States.
Hill, E., "Jess, the Rule Engine for the Java Platform", Java Expert System Shell, United States.
Connolly, D. et al., "DAML+OIL (Mar. 2001) Reference Description," W3C Note, Dec. 18, 2001, pp. 1-17, United States.
Kopena, J.B. et al., "DAMLJessKB: A tool for reasoning with the Semantic Web". IEEE Intelligent Systems, 2003, pp. 74-77, vol. 18(3), United States.
"DAML+OIL Specification", Mar. 2001, pp. 1-13, United States.
Berners-Lee, T. et al., "The Semantic Web: A new form of Web content that is meaningful to computers will unleash a revolution of new possibilities", Scientific American.com, May 17, 2001, pp. 1-5, United States.
U.S. Final Office Action for U.S. Appl. No. 11/121,820 mailed on Mar. 15, 2010.
U.S. Final Office Action for U.S. Appl. No. 11/444,994 mailed on Dec. 8, 2009.
U.S. Non-final Office Action for U.S. Appl. No. 11/444,994 mailed on Apr. 7, 2010.
U.S. Final Office Action for U.S. Appl. No. 11/444,994 mailed Sep. 3, 2010, United States.

* cited by examiner

METHOD AND SYSTEM FOR AUTOMATED INVOCATION OF DEVICE FUNCTIONALITIES IN A NETWORK

RELATED APPLICATION

This application claims priority from U.S. Provisional Patent Application Ser. No. 60/784,281, filed Mar. 20, 2006, incorporated herein by reference.

FIELD OF THE INVENTION

The present invention relates to invocation of functionalities in devices in a network, and more particularly to automated execution of tasks in electronics devices in a network.

BACKGROUND OF THE INVENTION

Electronic devices such a consumer electronics (CE) devices utilize a variety of approaches for invocation of their functionalities (e.g., UPnP, Jini). As new devices and technologies become available, new invocation mechanisms are required to operate these devices.

In existing approaches, the logic/code that performs device invocation is introduced during the design of a device or a design of the networked devices. New features such as support for invoking device functionalities are provided by introducing new code.

A shortcoming of such conventional approaches is that different devices provide different sets of application programming interfaces (APIs) for invocation of their functionalities. Even devices of the same class can differ in the way their functionalities are invoked.

Further, in network systems such as home-networking middleware systems, all of the different invocation mechanisms have to be incorporated during the design phase. As a result, the devices that the existing middleware systems can operate are fixed during the design phase, and are not easily expandable. As new devices and technologies become available, new interfaces are needed for invoking device functionalities. Conventionally, the middleware system has to be redesigned to invoke these new devices/technologies. Redesigning the existing middleware system requires writing new code. Further, the middleware system must be recompiled and reinstalled for the new code to take effect in the system. However, in CE devices (e.g., CD player, VCR, TV, DVD player, PVR, STB), unlike personal computers (PCs), installing new programs and updating existing programs is difficult due to scant support for such actions. Even if such support exists, it is not standardized for all CE devices.

Given the heterogeneity of CE devices, introducing a new invocation mechanism conventionally has been very difficult. There is, therefore, a need for a method and system that allows invocation of functionalities for new devices and technologies without requiring redesign or recoding of invocation mechanisms in electronic devices.

BRIEF SUMMARY OF THE INVENTION

The present invention provides a method and system that enables automatic invocation of device functionalities on electronic devices such as CE devices. Device function invocation mechanisms are provided to support heterogeneous function invocations including new function invocations. The invocation mechanisms can be added without the need for recompilation of systems that invoke device functionalities, such as home-networking middleware systems. The present invention further enables the use of scripts that can coordinate the use of multiple devices in accomplishing tasks that require multiple devices.

Further, in a system implementing automated execution of tasks and functions by devices, according to the present invention, logic/code that encapsulates device invocation functionality is represented as interpreted scripts such as ECMA/JavaScript. The system provides an environment where these scripts can be executed, which allows extendibility. New features can be introduced by adding new scripts without the need to recompile supporting modules. The distribution of new features to various devices in a system is made simple since the system has to merely download the script. No reinstallation or recompilation is required. This makes the system modular, and new device invocation mechanisms can essentially be introduced freely. Therefore, new device types and technologies can also be supported. Scripts can also be provided to perform tasks that span multiple devices.

These and other features, aspects and advantages of the present invention will become understood with reference to the following description, appended claims and accompanying figures.

DETAILED DESCRIPTION OF THE INVENTION

The present invention provides a method and system that enable automatic invocation of device functionalities on CE devices. In one embodiment, scripting languages are utilized for adding invocation mechanisms to support heterogeneous function invocation including new function invocation. The invocation mechanism can be added without the need for recompilation of the systems that invoke the device functionality. The present invention also enables use of scripts for coordinating multiple devices in accomplishing a task.

Example implementations are described hereinbelow in the context of CE devices in a home network environment. However, as those skilled in the art will recognize the present invention is useful in other environments as well such as systems where new functionality is added while the system is running, critical systems that cannot be turned off/restarted, etc.

Home networking middleware systems function to invoke devices in the network using interfaces provided by the devices. Middleware systems aggregate various devices and aggregate the content in some devices for presentation to a user. The middleware systems allow the users to operate networked devices individually or in various combinations.

An essential part of a middleware system is the capability to invoke device functionalities. For example, if the user wishes to see the list of music files on a CD loaded in a networked CD player, the middleware system queries the CD player using an interface provided by the CD player. In another example, a request is made to a networked TV to switch from playing broadcast TV to playing a DVD.

In one implementation, device invocation by middleware includes two levels. One level comprises Device Invocation (DI) which involves executing a single device functionality. An example is querying to find the songs on a CD in a networked CD player. Another level comprises Device Orchestration (DO) which involves coordinating multiple device invocations (device combinations) to achieve a task. An example is using a DVD in a networked DVD player to play a movie on a networked TV, which requires first obtaining the appropriate video stream from the DVD player and then passing the stream to the TV for display.

In one embodiment, the present invention incorporates interpreted scripts, such as ECMA/JavaScript, as extensions for handling both DI and DO, as described below.

Device Invocation Extensions

Figure 1:
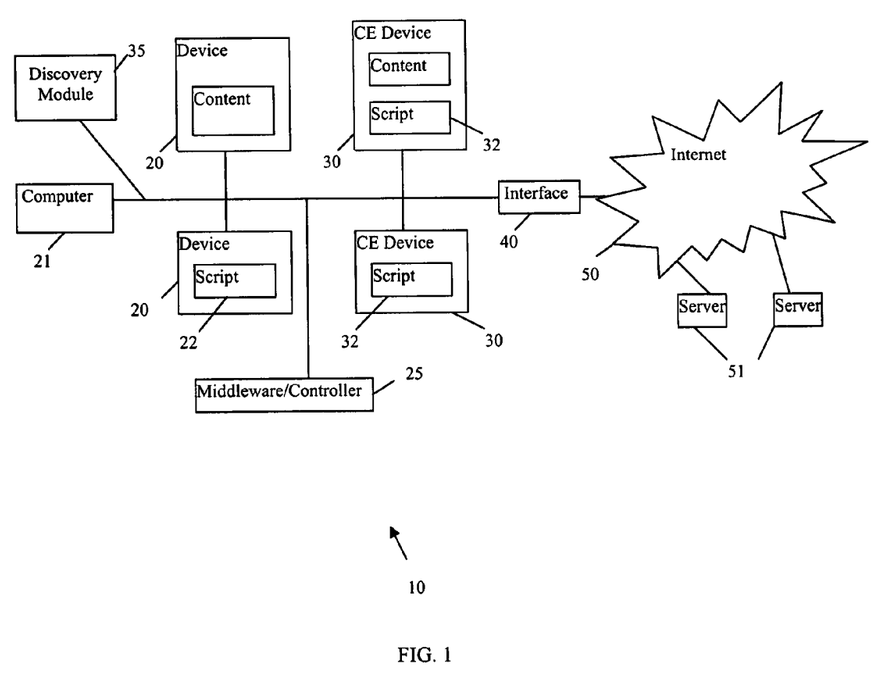
FIG. 1 shows a functional architecture of an example network, such as a home network, embodying aspects of the present invention.

FIG. 1 shows a functional architecture of an example network 10, such as a home network, embodying aspects of the present invention. The network 10 comprises devices 20 (e.g., databases, disk drives, appliances with processing capabilities) which may include content, CE devices 30 (e.g., DVD player, DTV, TV, CD player, PDA, set-top box, phone) which may include content, a PC 21, and an optional interface 40 that connects the network 10 to an external network 50 (e.g., another local network, the Internet). The external network can be connected to one or more servers 51. The devices 20, 21 and 30 can implement network communication protocols (e.g., Bluetooth, WiMax, WiFi, IEEE1394) for communication in the network 10. The system 10 further includes the middleware 23, as described hereinabove.

Each type of device in the network 10 (e.g., devices 20, CE devices 30) provides a fixed set of functionalities. These functionalities can be invoked using an API each device provides. In one example, according to the present invention, in the network 10, each device 30 provides a script file 32 that includes a function (method) for each of the functionalities of that device 30. The script file 32 can also include additional methods that are for internal use or methods that encapsulate alternate mechanisms for invoking device functionalities.

A discovery process is performed by a discovery module 35 (FIG. 1) according to the present invention, to discover the resources in the network 10. In one example, a process for discovery of each device, device functionality and device invocation is governed by various CE device frameworks such as UPnP, Jini, etc., as is known to those skilled in the art.

Figure 2:
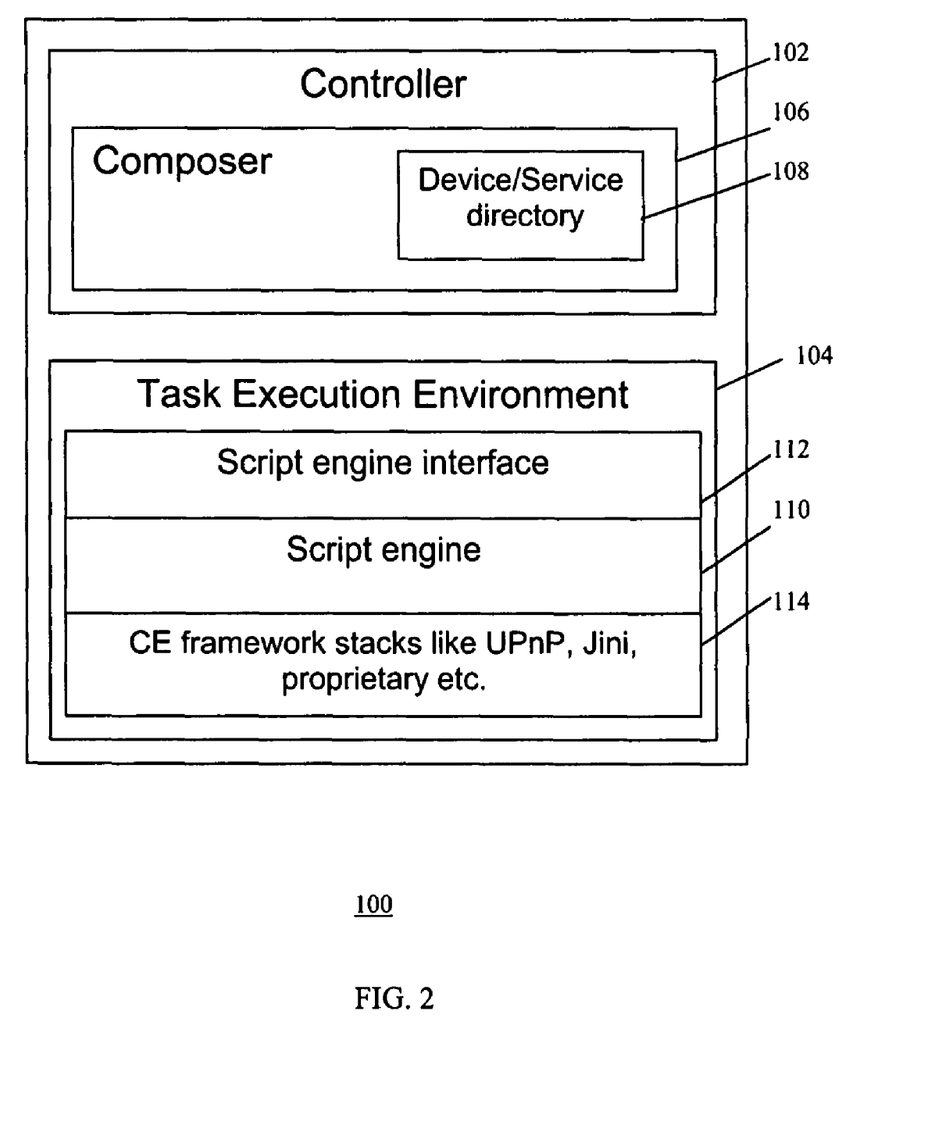
FIG. 2 shows a functional block diagram illustrating an example functional architecture of a controller and a Task Execution Environment (TEE) in a network, according to the present invention.

A device in the network 10 that performs the actual device function invocation is known as the controller and task execution environment (CTEE) 25, according to the present invention. FIG. 2 shows an example architecture 100 comprising an implementation of the CTEE 25 that includes a controller 102 and a task execution environment (TEE) 104, according to the present invention.

When a device (e.g., device 20, 30 in FIG. 1) in the network is discovered using the discovery process, the discovered device presents its script file to the controller 102. The controller 102 parses the script file from each discovered device to become aware of the functionalities that can be performed by each discovered device. Then, when the user decides to perform a task, a corresponding device function in the script file is executed. The scripts are executed in a script engine that is part of the architecture 100 in FIG. 2.

When a new class of devices is introduced into the network, each device provides a script file including methods corresponding to the new functionality. To invoke a new functionality, the system executes the corresponding new method. The methods can internally use various technologies (like UPnP stack, SOAP stack, HTTP, various XML standards etc) for executing the device functionality, as long as the scripting environment supports it. In this manner, the system remains modular and can be easily extended.

Automatic Device Orchestration

Tasks performed by the user in the network 10 often involve collaboration between multiple devices 20, 30. Performing a task that involves multiple devices involves coordination among the devices and the corresponding processes. This is achieved in the network 10 using task-level scripts 22, 32 that contain the methods that correspond to those tasks that involve multiple devices, according to the present invention.

For example, in the network 10, in order to play a movie DVD on a DVD player for display on a TV screen, first a stream/content identifier must be fetched from the DVD player. The identifier is then passed to a method that switches to the appropriate channel on the TV for displaying an input stream. Then, a second method corresponding to "PLAY" is activated on the DVD player. Sequence of steps such as the above can be encapsulated in a script and the task of playing a DVD from a DVD player on a TV can be performed by executing the script in the scripting engine, according to an embodiment of the present invention.

The architecture 100 allows invocation of device functionalities in the network 10, wherein the controller 102 in FIG. 2 performs actual device function invocation. The controller 102 includes a composer module 106 that contains a device/service directory 108. The directory 108 maintains all of the methods in the script files obtained from the devices in the network from the discovery process described above. The discovery module 35 can be implemented as a standalone device, or in one of the devices, e.g., 20, 21 or 30 in FIG. 1. The controller 102 can be implemented in a standalone device, or in one of the devices, e.g., 20, 21 or 30 in FIG. 1. The TEE 104 can be implemented in a standalone device, or in one of the devices, e.g., 20, 21 or 30 in FIG. 1. Further, two or more of the controller 102, the TEE 104 and the discovery module 35 can be implemented in the same device in FIG. 1

The composer module 106 is responsible for transforming user actions into commands to the TEE 104. Commands to the TEE 104 are requests for executing methods in the script files provided by the discovered devices in the network. Scripts are executed by a script engine 110 via a script engine interface 112 in the TEE 104. The script engine 110 utilizes stacks 114 in the TEE 104, wherein the stacks 114 correspond to different technological CE device frameworks such as UPnP, Jini, etc., and provide support for networking protocols like Ethernet, WiFi, Bluetooth, etc.

Figure 3:
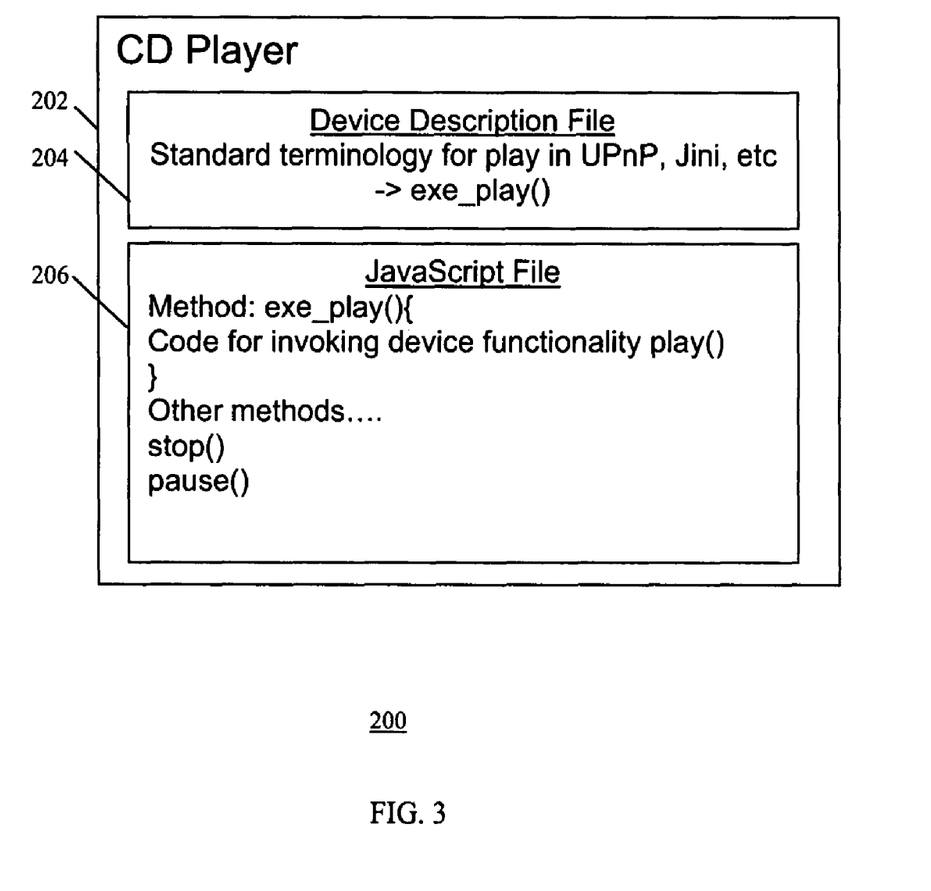
FIG. 3 show a block diagram for an electronic device in a network, including a device description file and a script file, according to an embodiment of the present invention.

FIG. 3 show a block diagram 200 for a device such as a CD player 202 in the network (e.g., a device 30 in FIG. 1), including example fragments of a device description file 204 and a script file 206. The CD player 202 is one of the devices discovered in the network by the controller 102 in FIG. 2. After the discovery process, the device description and the script files 204 and 206, respectively, of the CD player 202 are maintained in the directory 108 of the controller 102.

The device description file 204 contains mapping between standard terminologies and the corresponding methods in the script file 206. For example, the device description states that play( ) is its implementation of AVTransport:Play( ), wherein AVTransport:Play( ) is a standard UPnP service to start the play functionality on a UPnP device. The script file 206 contains methods like play( ) implemented in a scripting language. In one example where AVTransport:Play( ) is mapped to a method x, the controller 102, knowing that AVTransport:Play( ) is for playing, achieves a play operation by executing the method x.

Figure 4:
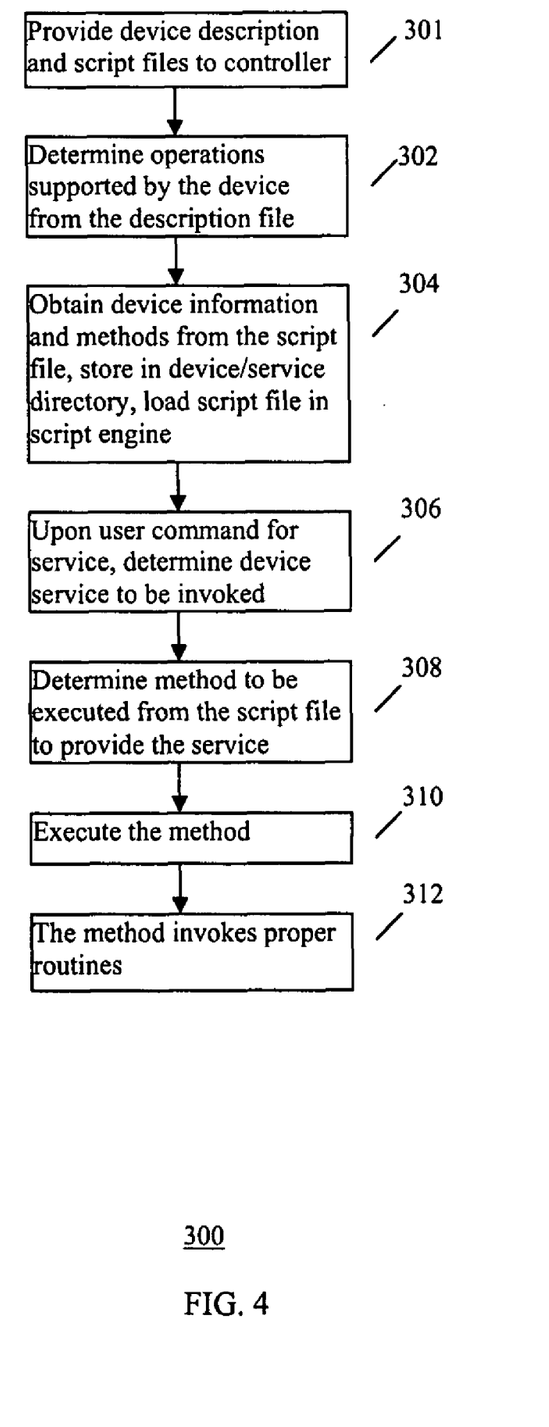
FIG. 4 shows a flowchart of the steps of a process for device functionality invocation using the device description and script files, according to an embodiment of the present invention.

Example operation scenarios according to the present invention are now described. Referring to the example process 300 in FIG. 4, in a first example scenario, the flow of action involved in device functionality invocation using the device description file 204 and the script file 206 in FIG. 3, includes the steps of:

Step 301: When the device 202 is discovered by the controller 102, the device 202 presents its device description file 204 and the script file 206 to the controller 102.

Step 302: The composer 106 parses the device description file 204 to determine and then present to the user, the various operations/functions supported by the device 202.

Step 304: The controller 102 parses the script file 206 and stores the device information and names of the corresponding methods into the device/service directory 108. An example of the directory 108 includes the entries:
AVTransport:Play - - - playCD
AVTransport:Play - - - playDVD
. . . .

The methods are stored in the script engine 110, wherein if play( ) is a method, then the composer 106 finds the name play( ) from the directory and asks the script engine 110 to execute the method play( ). The controller 102 also loads the script into the script engine 110 via the interface 112, so that the script file is presented by the device 202. Invoking a method (in the script file) requires an environment for execution (e.g., TEE 104), which is provided by the script engine 110.

Step 306: Based on the underlying technology used by the device 202 (e.g., UPnP, Jini), the composer 106 determines the service to be invoked on the device 202. For example, to start playing a CD on the CD UPnP-based player 202, the method corresponding to AVTransport: Play service (i.e., play in the example) has to be invoked.

Step 308: Using the device name (e.g., CD Player) and the standard service name (AVTransport:Play), the method to be executed is determined from the script file 206 from the directory 108. Assuming a CD player and a DVD player in the network 10 both have the same method name corresponding to AVTransport:Play( ), the directory 108 stores two entries:
AVTransport: Play( ) - - - CD Player: play( )
AVTransport: Play( ) - - - DVDPlayer: play( ).

Step 310: Execution of the method is performed by the script engine 110, as controlled by the interface 112. The interface 112 provides a method to the task composer 106 (e.g., executeMethod). This method is coupled to the script engine 110, which can be invoked as executeMethod("CDPlayer.play( )") or executeMethod("DVDPlayer.play( )"). When executeMethod("x( )") of the interface 112 is invoked, the script engine executes the method x( ).

Step 312: The code inside the method (e.g., exe_play( )) in the script file 206 includes calls to required routines, and these routines send appropriate messages to the device 202 and the CD is played. The routines are performed inside the method to perform an action on a device (e.g., the method play( ) includes UPnP calls needed to start play on a device). In the example of playing a movie using a DVD player device 202, the code inside the method exe_play contains calls to UPnP routines, and the UPnP routines invoke the play method on the device 202 and the movie is played by the device 202.

Figure 5:
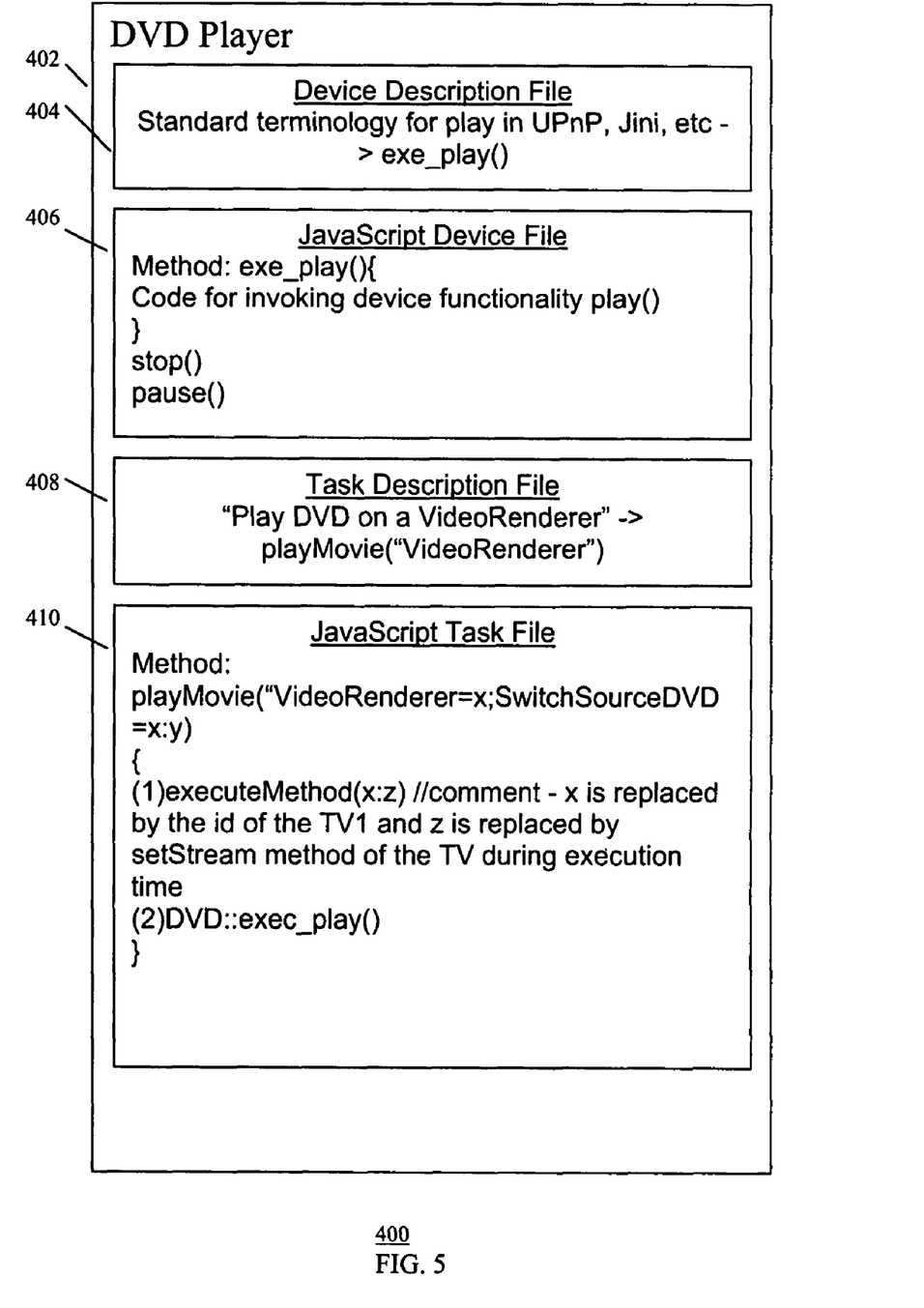
FIG. 5 show a block diagram for an electronic device such as a DVD player in a network, including a device description file, a device script file, a task description file and a task script file, according to an embodiment of the present invention.
Figure 6:
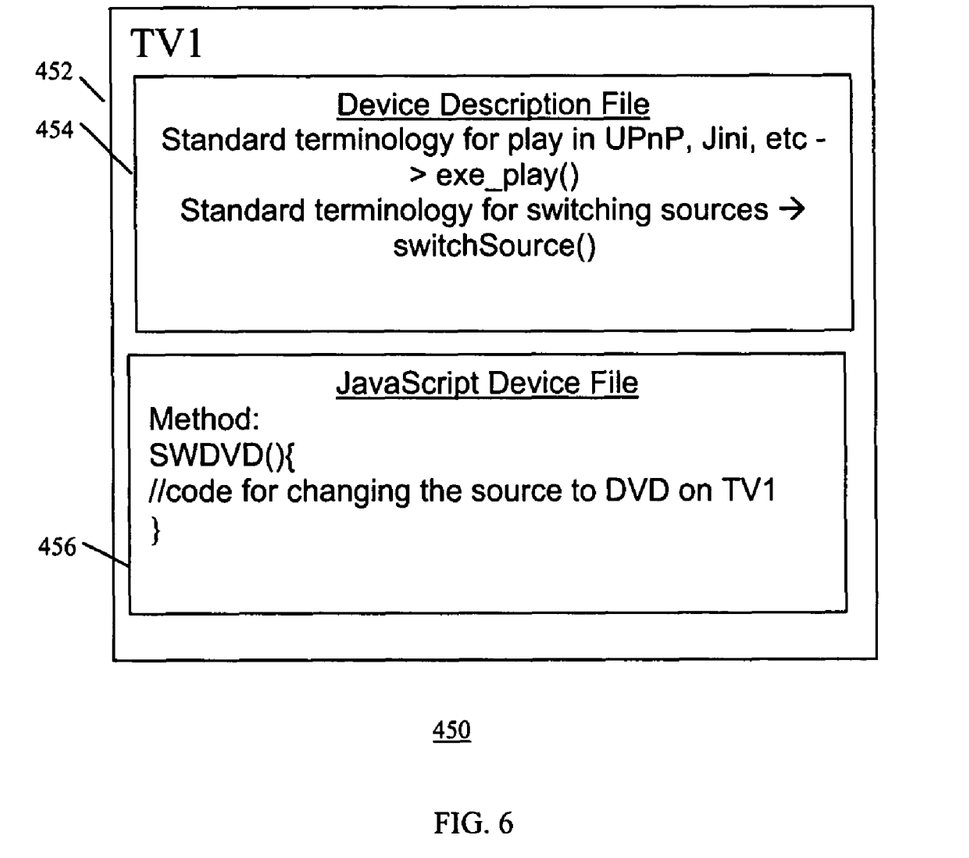
FIG. 6 show a block diagram for an electronic device such as a TV in a network, including a device description file, a device script file, a task description file and a task script file, according to an embodiment of the present invention.

In a second example operation scenario, execution of a task is orchestrated in the network 10 using scripts. FIG. 5 shows an example block diagram 400 for a device, such as a DVD player 402 (e.g., a device 30 in FIG. 1) in the network. The device 402 includes example fragments of a device description file 404, a device script file 406, a task description file 408 and a task script file 410. FIG. 6 shows a similar example diagram 450 for a TV 452 (TV1) in the network 10 (e.g., a device 30 in FIG. 1). The TV 452 includes a device description file 454 and a device script file 456.

The steps of discovery and processing of device/task description and scripts for the DVD player 402 and the TV 452 are similar to that explained above. Specifically, the DVD player 402 is one of the devices discovered in the network by the controller 102 in FIG. 2. After the discovery process, the relevant files (i.e., the device and task description files and the device and task script files) of the DVD player 402 are maintained in the directory 108 of the controller 102. The TV 452 is also one of the devices discovered in the network by the controller 102 in FIG. 2. After the discovery process, the relevant files (i.e., the device and task description files) of the TV 452 are maintained in the directory 108 of the controller 102.

A task description file provides the controller 102 (FIG. 2) with information about the sequence of methods to be executed on the various devices in the network to achieve a task, such as playing a movie from a DVD player on a TV in the network. A task script file is similar to a device script file, but instead of containing routines that invoke device functionalities, a task script file contains the sequence of device functionalities that are to be invoked to achieve tasks in the network. This is represented in the task script as a sequence of methods. For example, playMovie("VideoRenderer=x; SwitchSourceDVDMethod=x:y") is the method in the task script file required to start playing a movie from the DVD player on the TV. The above method signature takes the VideoRenderer or the ID of the display device on which the movie is to be viewed and the name of SwitchSourceDVD on the TV required for executing the task. In the above example x is the argument that carries the name of the VideoRenderer i.e., x=TV1 and y is the name of switchSourceDVD method in x. During runtime the call made would be playMovie(TV1; TV1:SWDVD) where SWDVD is the name of switchSourceDVD method on TV1.

Figure 7:
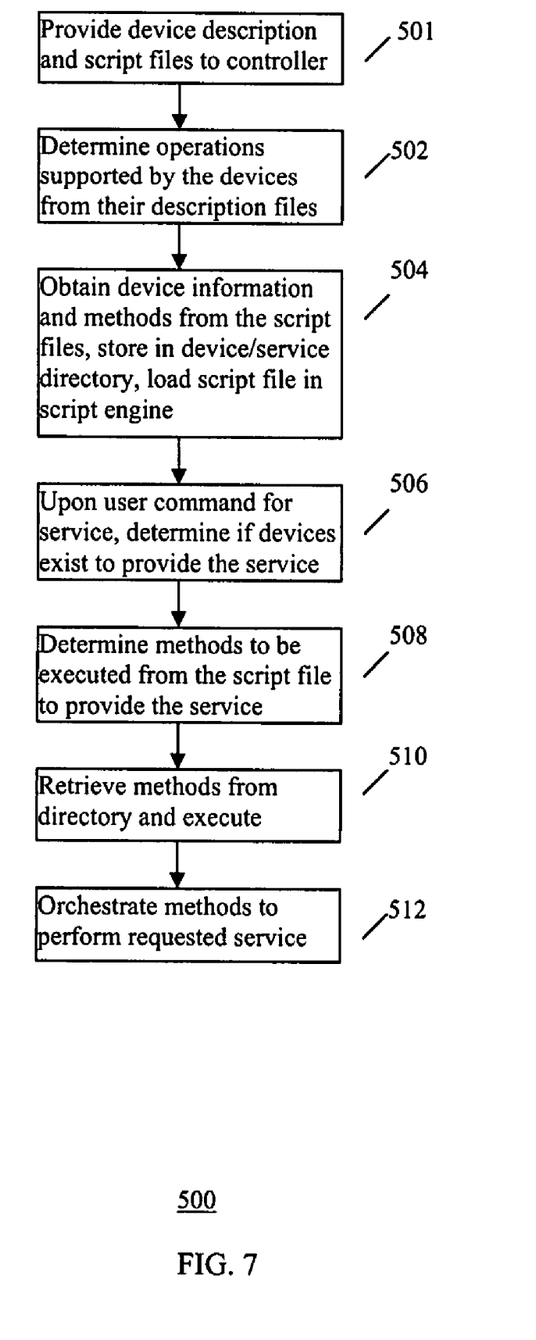
FIG. 7 shows a flowchart of the steps of a process for functionality invocation using the description files and script files in FIGS. 5-6 to orchestrate two devices to perform a task (e.g., a DVD player and a TV to cooperatively perform a task) in the network, according to an embodiment of the present invention.

Referring to the process 500 in FIG. 7, in the second example scenario, the flow of action involved in device functionality invocation using the description files and script files in FIGS. 5-6 to orchestrate the DVD player 402 and TV 452 to cooperatively perform a task, includes the steps of:

Step 501: Perform discovery to provide device/task description and scripts files 404-410 of the DVD player 402, and device/task description files 454, 456 of TV 452, to the controller 102.

Step 502: Determine the operations supported by the DVD player 402, wherein the device script file 406 provides the functionalities of the DVD player 402 and the task script file 410 provides the tasks that the DVD player 402 can participate in. Task description 408 and the script files 406, 410 are optional. They could either come from the TV 452 or the DVD player 402 since both play a role in the example task.

Step 504: Obtain device and task descriptions 404, 408, and obtain methods from the script files 406, 410 and store in the device/service directory 108, load script files 406, 410 in the script engine 110.

Step 506: When the user chooses an operation such as e.g., "Play DVD on TV1", the composer 106 determines if there is a service corresponding to "Play DVD on TV1" in the directory 108.

Step 508: The composer 106 finds a matching entry in the directory 108 corresponding to "Play DVD on VideoRenderer" for which the corresponding method is playMovie("VideoRenderer=x;switchSourceDVD=x:y"), wherein x and y are place holders for identifying the display device and name of the switchSourceMethod on the display device execute methods.

Step 510: The task composer 106 first retrieves the switchSourceDVD method of the TV 452 (TV1) from the directory 108 and prepares the playMovie ("VideoRenderer=x;SwitchSourceDVDMethod=x:y" method for execution by looking for a device that is a VideoRenderer and provides a switchSourceDVD method. A directory search yields TV1 as the candidate.

Step 512: The task composer 106 orchestrates the task by executing the playMovie(TV1;TV1:SWSDVD) method, the composer 106 first switches the source on the TV to display DVD by invoking the SWDVD method of TV 452 (TV1) and then invokes play on the DVD Player 402. The playMovie method finally invokes play( ), which was loaded into the script engine 110 when the TV 452 (TV1) was discovered.

As such, in a system implementing automated execution of tasks by devices, according to the present invention, logic/code that encapsulates device invocation functionality is represented as interpreted scripts such as ECMA/JavaScript. The system provides an environment where these scripts can be executed, providing extendibility for additional features. New features can be introduced by adding new scripts without the need to recompile supporting modules (e.g., home-networking middleware). The distribution of new features to various devices is made simple since the system has to merely download the script. No reinstallation or recompilation is required. This makes the system modular and new device invocation mechanisms can essentially be introduced freely. Therefore, new device types and technologies can also be supported. Scripts can also be written that can perform tasks that span multiple devices.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for invocation of functionalities in a network, comprising:
    discovering invocation scripts for invoking functionalities of one or more devices in the network wherein each of the one or more devices includes a script file interpretable as representing device invocation functionality for the corresponding device;
    executing the scripts to automate invocation of the functionalities of said one or more new devices in the network, wherein the functionality of a device comprises an operation that the device is capable of performing; and
    providing scripts that coordinate the combined use of each of the discovered one or more devices in the network for accomplishing a task.

2. The method of claim 1, wherein the interpreted scripts are executed to provide additional functionality.

3. The method of claim 1 further including providing a task execution environment where the scripts can be executed.

4. The method of claim 1 further including adding new scripts for new device features without recompiling.

5. The method of claim 1 wherein providing invocation scripts further includes providing invocation scripts for heterogeneous function invocations and adding new function invocations in the network.

6. The method of claim 1, wherein the functionalities include multimedia device operational functions.

7. The method of claim 1, wherein the functionality comprises one or more electronic operations used to perform a multi-media task.

8. A method of automating the execution of tasks in a network, comprising:
    connecting one or more devices to the network, each device including a script file representing device invocation functionality that upon execution enables the device to perform a function;
    performing discovery to read the script files of the connected one or more devices and obtain device information about the functionality of each device in the network, wherein the functionality of a device comprises an operation that the device is capable of performing; and
    upon a request to perform a task in the network, determining the device functionality required to perform the task and invoking the required device functionalities using scripts encompassing device functions to automate the execution of the task.

9. The method of claim 8 further comprising providing a task execution environment for execution of the scripts.

10. The method of claim 8 wherein performing discovery further includes:
    obtaining information about the functionality of each discovered device; and
    storing the provided device information in a directory.

11. The method of claim 10 wherein determining the device functionality required to perform the task further includes checking the device information in the directory to determine the device functionality required to perform the task.

12. The method of claim 11 wherein:
    the script file in each device includes routines which upon execution enable the device to perform an electronic function; and each device further includes a device description file that provides mapping between a standard service name and corresponding routines in the script file that perform a function.

13. The method of claim 12 wherein performing discovery to obtain device information further includes:
obtaining information from the description file and the script file of each discovered device;
parsing each device description and script file to determine the various functions supported by the device; and
entering the device functionality information in the directory.

14. The method of claim 13 wherein determining the device functionality required to perform the task further includes checking the device information in the directory to determine if the required device functionality for performing the task is available.

15. The method of claim 14 wherein invoking the device functionalities for performing the task by one or more devices, further includes:
using the device name and the standard service name to check the directory in determining the script file routine to be executed; and
executing the determined script file routine in a task execution environment.

16. The method of claim 15 wherein the task execution environment comprises a script engine and a script engine interface for executing script files.

17. The method of claim 15, further comprising:
upon executing the determined script file routine in the task execution environment, orchestrating the device functionalities to perform the task.

18. A system for invocation of functionalities in a network, comprising:
a discovery module to discover device information from each of one or more electronic devices in a network, with each of the one or more electronic devices including a device script file representing device invocation functionality, wherein upon execution, a script file enables a corresponding device to perform an electronic function;
the discovery module further configured to obtain device information about the functionality of each device, wherein the functionality of a device comprises an operation that the device is capable of performing; and
a controller configured to determine the device functionality required to perform a task based on the discovered device information, and to invoke the required device functionalities using scripts to automate the execution of the task, wherein the controller controlling the device functionalities for performing the task.

19. The system of claim 18 further comprising a task execution environment including a scripting engine for execution of the scripts.

20. The system of claim 18 wherein the controller is further configured to store the discovered device information including functionalities in a directory.

21. The system of claim 20 wherein the controller includes a composer configured to check the device information in the directory to determine the device functionality required to perform the task.

22. The system of claim 21 wherein:
the script file in each device includes routines which upon execution enable the device to perform a function; and
the system further comprises a device description file for each device, providing mapping between a standard service name and corresponding routines in the script file that perform a function.

23. The system of claim 22 wherein the controller is further configured to parse the device description file and the script file of each discovered device, to determine the functions supported by the device and store the device functionality information in the directory.

24. The system of claim 23 wherein the composer is configured to determine the device functionality required to perform the task by checking the device information in the directory to determine if the required device functionality for performing the task is available.

25. The system of claim 24 wherein the controller is configured to invoke the device functionalities for performing the task using the device name and the standard service name to access the directory for the script file routine to be executed, and then executing the determined script file routine in the task execution environment.

26. The system of claim 22 wherein each device includes:
a task description file comprising—a sequence of methods for execution on one or more devices in the network to perform a task; and
a task script file comprising—a sequence of device functionalities that are invoked for performing tasks in the network.

27. An apparatus for invocation of functionalities in a network of devices wherein one or more of the devices include a device script file that enables performing a function, comprising:
a controller configured for determining electronic device operational functionality of an electronic device required to perform a task based on
device information, wherein the functionality of a device comprises an operation that the device is capable of performing; and
a task execution environment including a scripting engine for execution of scripts in the device script file;
wherein the controller is further configured for invoking the required device operational functionalities by invoking execution of scripts in the task execution environment by the scripting engine, for automating the execution of the task, wherein the controller controlling the device operational functionalities for performing the task.

28. The apparatus of claim 27 further comprising a discovery module configured for obtaining device information about the operational functionality of each device for the controller.

29. The apparatus of claim 28 wherein the controller is further configured for storing the discovered device information including device functionalities in a directory.

30. The apparatus of claim 29 wherein the controller includes a composer configured for checking the device information in the directory for determining the device operational functionality required to perform the task.

31. The apparatus of claim 30 wherein:
the script file in each device includes routines which upon execution enable the device to perform an electronic function; and
the system further comprises a device description file for each device, providing mapping between a standard service name and corresponding routines in the script file that perform a function.

32. The apparatus of claim 31 wherein the controller is further configured for parsing the device description file and the script file of each discovered device, for determining the functions supported by the device and storing the device functionality information in the directory.

33. The apparatus of claim 32 wherein the composer is configured for determining the device functionality required to perform the task by checking the device information in the directory to determine if the required device functionality for performing the task is available.

34. The apparatus of claim 33 wherein the controller is configured for invoking the device functionalities for performing the task using the device name and the standard service name for accessing the directory for the script file routine to be executed, and then executing the determined script file routine in the task execution environment.

35. The apparatus of claim 31 wherein each device includes:
 a task description file; and
 a task script file.

36. The apparatus of claim 35, wherein the task script file includes tasks that a particular device participates in providing a function.

37. The apparatus of claim 27, wherein the task is a multimedia task performed by one or more of: a DVD device and a television (TV) device, coupled to the network.

* * * * *